United States Patent [19]

Collins

[11]  4,209,007
[45]  Jun. 24, 1980

[54] SOLAR HEATING SYSTEM, AND CONTROL DEVICES THEREFOR

[75] Inventor: David L. Collins, Woodland Hills, Calif.

[73] Assignee: Solargenics, Inc., Chatsworth, Calif.

[21] Appl. No.: 792,314

[22] Filed: Apr. 29, 1977

[51] Int. Cl.² ............................................. F24J 3/02
[52] U.S. Cl. ................................. 126/422; 126/419; 126/437
[58] Field of Search .............. 126/270, 271; 237/1 A; 137/79, 468; 165/40, 34.5; 236/34, 91 F, 93 R

[56] References Cited

U.S. PATENT DOCUMENTS

| 2,553,302 | 5/1951 | Cornwall | 126/271 X |
| 2,762,569 | 9/1956 | Caillol | 126/271 X |
| 3,239,000 | 3/1966 | Meacher | 126/271 |
| 3,659,783 | 5/1972 | Schwartz | 137/468 |
| 3,792,813 | 2/1974 | Saur et al. | 236/34 X |
| 3,986,489 | 10/1976 | Schlesinger | 126/271 |

Primary Examiner—James C. Yeung
Assistant Examiner—Larry Jones
Attorney, Agent, or Firm—I. Morley Drucker

[57] ABSTRACT

This invention is directed towards a low-cost solar heating system, or apparatus, which has substantially increased energy efficiency over fixed flow systems. The apparatus of this invention includes a closed flow system including flow lines for fluid such as liquid or air, to and from a solar collector panel, flow lines from the solar collector panel to storage means, and a circulating pump in the system for circulating fluid from the storage tank to the solar collector via a pump supply line. The preferably fixed-flow circulating pump is actuated by a thermally responsive switch set at a predetermined temperature setting, for example, 100° F. The system of this invention also incorporates, in combination with the thermal switch for the pump, a thermally responsive valve means placed in a fluid circulating line, and opening in proportion to the temperature sensed by the valve means to increase or decrease the flow of fluid to and from the collector in response to the valve temperature increase or decrease. The thermally responsive valve is inexpensive and can be readily set to commence opening at any predetermined temperature, e.g. 110° F. Variable fluid flow in the system of this invention may be reliably maintained proportional to a combination of thermal gradients imposed by ambient and solar temperatures.

6 Claims, 4 Drawing Figures

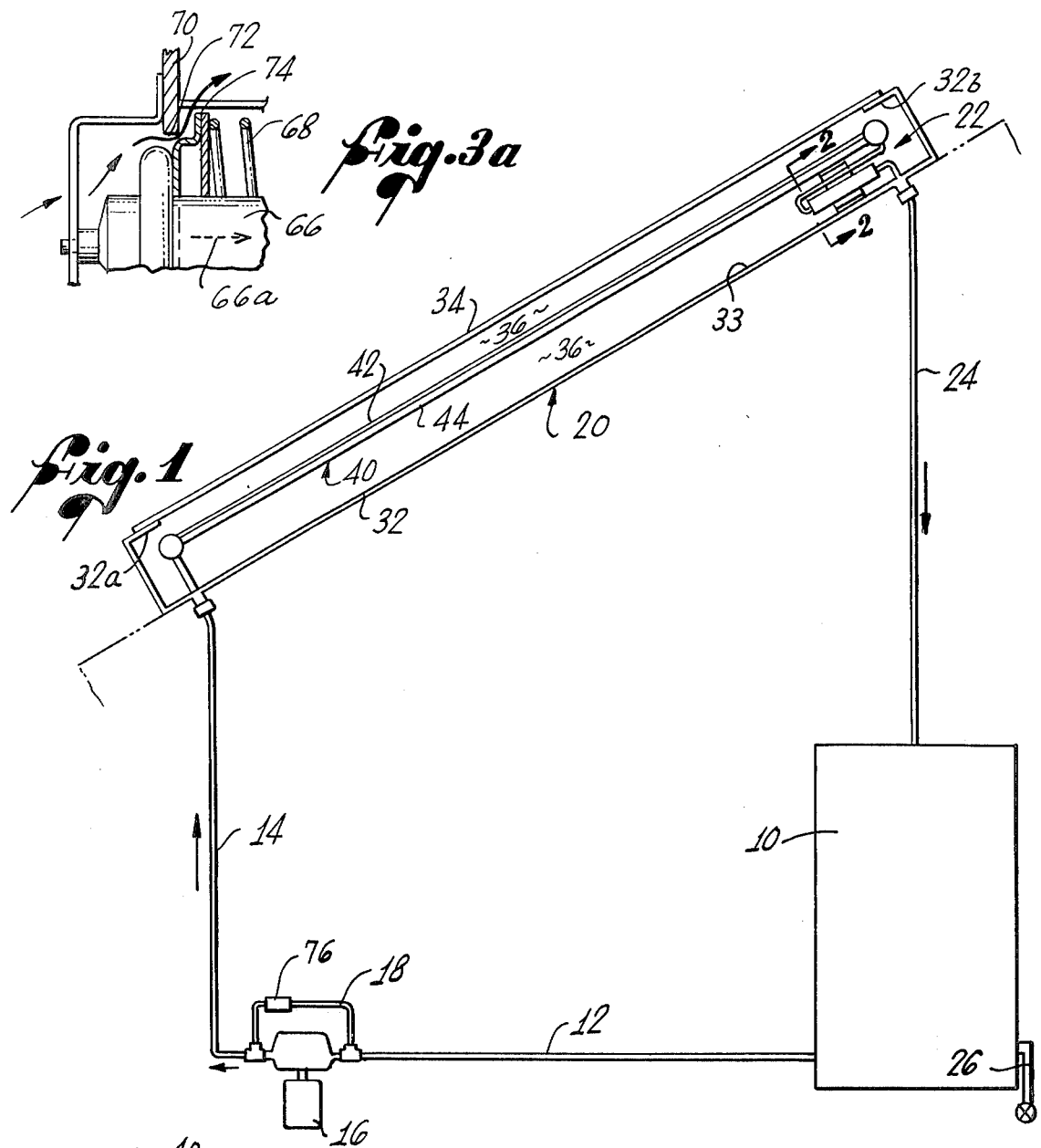
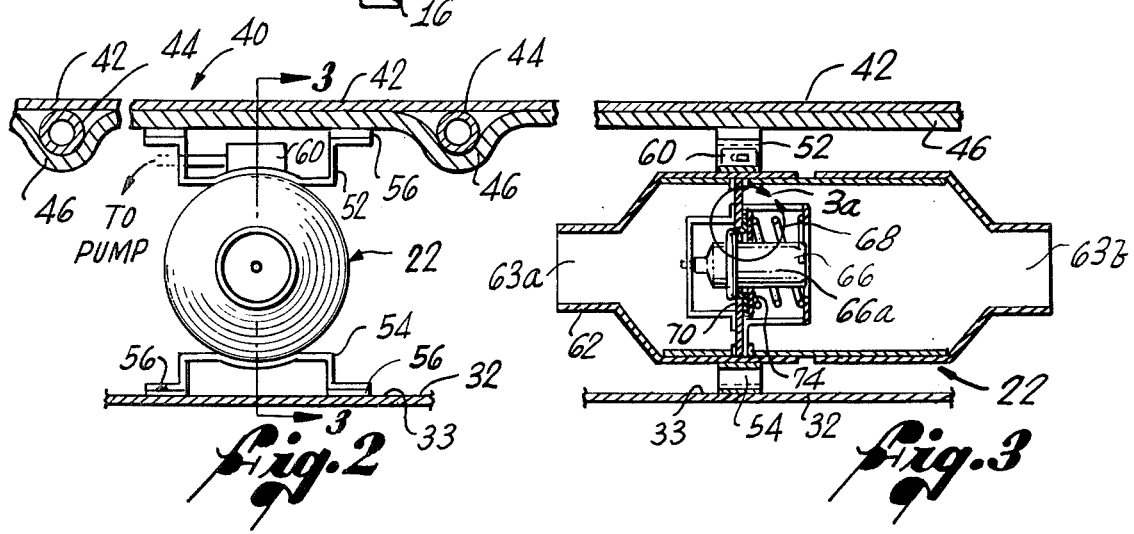

SOLAR HEATING SYSTEM, AND CONTROL DEVICES THEREFOR

BACKGROUND OF THE INVENTION

In conventional solar systems, using either flat plate liquid, concentrating liquid, or flat plate air solar collectors, an electronic differential sensing system, which senses the difference in temperature between storage and outlet temperatures, is normally used to turn on the system pump or blower. The normal differential temperature sensed lies in a range of between about 12°–20° F. Once the temperature differential is exceeded, the system pump will cause flow of liquid or air through the collector. The flowing fluid, or air, is then heated by the sun, and its energy is delivered to storage or is used directly.

In most present systems, the fluid flow is constant and is adjusted by means of a control valve which must be set for each installation.

Constant fluid flow through the collector is, however, not completely efficient. Optimally, one wishes to have a greater fluid flow rate through the collector when the collector panel temperature and/or the ambient air is hot; conversely, one wishes to have a lower fluid flow rate through the collector when the collector panel temperature and/or ambient air is cool. In this way, the greatest efficiency for the collector can be realized.

In a limited number of systems variable flow is achieved by varying the speed of the pump device using a proportional differential electronic control unit. However, variable speed pumps are extremely costly and render the use of such pumps economically impractical for many, smaller installations, such as may be used for homes and small office or apartment buildings.

To the best of my knowledge, no low-cost solar collectors are being made, or marketted, which rely on variable fluid flow through the solar collector, to increase efficiency, without requiring the use of variable speed pumps, as other costly electronic controls and sensing systems.

SUMMARY OF THE INVENTION

This invention is directed towards a low-cost solar heating system, or apparatus, which has substantially increased energy efficiency over fixed flow systems, avoids the need for expensive electronic differential control devices and their dual sensors, as well as avoiding the need for fixed flow control devices and the need for variable speed pumps. My system possesses other advantages as well, such as the prevention of reverse convective night time flow and eliminating the need for a collector loop check valve.

The apparatus of this invention includes a closed flow system including flow lines for fluid such as liquid or air, to and from a solar collector panel, flow lines from the solar collector panel to storage means, and a circulating pump in the system for circulating fluid from the storage tank to the solar collector via a pump supply line.

The circulating pump is actuated by a thermally responsive switch set at a predetermined temperature setting; for example, 100° F., the switch being preferably made responsive primarily to the panel temperature of the solar collector. The pump means may be of an inexpensive, non-variable type.

The system of this invention also incorporates, in combination with the thermal switch for the pump, a thermally responsive valve means placed in a fluid circulating line, and opening in proportion to the temperature sensed by the valve to increase or decrease the flow of fluid to and from the collector in response to the valve temperature increase or decrease. The thermally responsive valve is inexpensive and can be readily set to commence opening at any predetermined temperature, e.g., 110° F.

The valve means is preferably adapted to sense both the ambient and solar panel temperatures and, preferably, is placed in heat-conductive contact with the thermal switch operating the pump. Thus, variable fluid flow in the system of this invention may be reliably maintained proportional to a combination of thermal gradients imposed by ambient and solar temperatures.

Furthermore, the circulating fluid pump is usually set into operation at a temperature 5°–10° F. below the temperature at which the thermally-responsive valve is first set to open. If the ambient temperature and/or the solar panel temperature should drop, the pump may continue to operate with the valve closed but the system is provided with a pump by-bass loop in order to protect the pump from damage. And, of course, if the temperature drops below the activating temperature of the thermal switch to the pump, the pump will be switched off.

The system of this invention, which utilizes a thermal switch for automatically controlling the pump responsive to the solar panel (and/or the ambient) temperature in combination with a thermally responsive valve means, which variably controls the fluid flow rate responsive to both the solar panel and ambient temperatures, results in a low cost, efficient energy production system.

The system of this invention provides an increased energy efficiency over fixed fluid flow collectors of approximately 8%.

The system of this invention can be utilized to control the efficiency of a single solar collector or an array of solar collectors arranged in a series or parallel flow. It also provides automatic control of fluid flow rate through the solar collector or collectors without external power. Also, the system of this invention is applicable to optimization of the efficiency of flat plate solar collectors, concentrating collectors, arrays of flat plate and concentrating collectors, air collectors and arrays of same regardless of internal configuration of these varying types of collectors. The system of this invention does not require electronic control devices, multiple electronic sensors or check valves in the collector bypass loop, and is thus highly simplified and inexpensive as compared to those of the prior art.

BRIEF DESCRIPTION OF THE DRAWINGS

FIG. 1 is a schematic view, in side elevation, of an apparatus of my invention, illustrating one preferred embodiment thereof;

FIG. 2 is a partially cross-sectional view of the thermally responsive valve means and thermal switch for the circulating pump of the invention, taken along the line 2—2 of FIG. 1;

FIG. 3 is an axial cross-sectional view of the valve means taken along the line 3—3 of FIG. 2; and FIG. 3a is an enlargement of a portion of FIG. 3 taken along the arcuate arrow 3a.

DETAILED DESCRIPTION OF THE INVENTION

Referring first to FIG. 1, a typical system in which my invention is incorporated is shown. A storage tank 10 containing fluid such as water, has a pump supply line 12 leading therefrom into a collector supply line 14. A pump 16 is operably connected into pump supply line 12 to pump fluid into collector supply line 14. The pump 16 is made responsive to a thermal switch 60, which energizes a conventional circuit (not shown) to start the pump. A bypass loop 18 for the bypass of fluid around pump 16 is provided between lines 12 and 14.

The fluid is pumped into a solar collector 20, under the control of thermal switch 60, through a thermally responsive valve means 22 provided in the upper or hotter end of the collector 20, and thence returned to storage means 10, via return line 24. Hot water is taken from storage means 10, via line 26, as needed.

The solar collector 20 may be of conventional type, except for the provision of the thermally responsive valve means 22 and thermal switch 6a. Thus, the collector 20 comprises a housing 32, a glazing panel 34 affixed to the lower and upper ends 32a, 32b of the housing to form an interior air space 36. Within the air space 36 is the solar panel 40 which comprises an absorber plate 42, preferably made of a conventional thermally conductive material, to the underside of which are held a plurality of spaced pipes 44 by means, for example, of a retainer plate 46.

The thermally responsive valve means 22 employed as part of the system of this invention is made and located, so as to sense a combination of solar panel temperature and ambient temperatures in the following way. The valve means 22 is stably retained between the collector housing 32 (usually made of a metal such as aluminum) and the solar panel 40 by means of a pair of upper and lower U-shaped metal coupling brackets 52, 54, respectively. The ends of brackets 52, 54 are held to the retaining plate 46 and to collector housing 32 by any suitable means, such as by conventional adhesives. As best shown in FIG. 1, valve means 22 is mounted between solar collector panel 40 and a rear wall 33 of collector housing 32. Both the valve means 22 and the portion of the rear wall 33 to which bracket 54 is attached are shielded by the solar panel 40 and thus unexposed to solar radiation. Insulation pads 56 may be interposed between the bracket ends and the retaining plate 46 and collector housing 32, if desired, as shown. In either event, the temperature attained by the valve means 22 will be approximately equal to the thermal gradient attained by the average of the hot end of the solar panel temperature 40 and the collector housing 32 (which is exposed to ambient temperature).

The thermal switch 60 for the pump 16, is affixed directly to the coupling bracket 52 (see FIGS. 2 and 3, especially) and thereby attains a temperature which is more directly influenced by the solar panel temperature 40; however, its temperature will not be equal to the solar panel temperature.

The valve means 22 comprises a valve housing 62, the ends 63a, 63b, of which are connected to the supply line 44 and return line 24, respectively. Affixed to the interior of the valve housing 62 is the valve means proper, which comprises a thermally responsive central valve body 66, movable to the right, as viewed in the direction of the dashed arrow 66a, in FIGS. 3 and 3a, to overcome the force of coil spring 68, and causing an opening 72 or cracking of the valve seat 70 with respect to the flange 74 carried by the valve body 66. The amount of the opening 72 of the valve means 22 is directly proportional to the temperature of the valve body 66. When the valve means is below the minimum activation temperature, the spring 68 holds the flange 74 of the valve body 66 against the valve seat 70.

The operation of the apparatus of this invention follows:

The sunlight passing through solar glazing cover 34 causes the solar panel 40 to become hot and exceed the pre-set activation temperature for the thermal switch 60, and causes an electrical circuit to close (not shown as it is conventional) to thereby start the pump 16 at e.g., 100° F. Fluid will then move from the storage tank 10, via the energized pump 16, and into the pipes 44 of solar panel 40. Until the time that the valve means 22 reaches a preset temperature, e.g., 110° F., the fluid being pumped by pump 16 will recirculate through a bypass loop 18, the bypass loop preferably containing a flow restriction means 76. The bypass loop 18 thus prevents damage to the pump 16.

As the valve means 22 reaches the pre-set predetermined minimum temperature, it opens allowing heated fluid to pass therethrough. Valve means 22 controls the rate of flow of fluid depending upon the panel temperature and the ambient temperature, as previously discussed. In general, the higher the ambient and panel temperatures, the greater the rate of fluid flow through the collector, and the converse is also true.

Large solar arrays consisting of many solar collectors, each collector having its own valve means 22, enables automatic optimally efficient flow in direct response to the solar panel temperature of each collector in the array.

In addition to the advantages of economy, for reasons previously set forth, it is to be noted that at night, when cool temperatures prevail, the closed valve means positively prevents any back flow, or convective flow from the storage tank.

Various modifications may be made by those skilled in the art, which may be within the scope of this invention. Hence, I intend to be limited only to the claims which follow.

I claim:

1. In an improved control apparatus for a solar collector system comprising at least one solar collector assembly, each including a solar collector panel and a collector housing, said collector housing being substantially exposed to the ambient temperature, fluid input means to said solar collector, fluid exit means from said solar collector, associated means which together with said solar collector and said fluid input and fluid exit means constitutes a closed fluid path, and a pump for pumping fluid through said closed fluid path system, said control apparatus including a thermally responsive switch means for energizing said pump means located in said solar energy collector system so as to sense a temperature which includes the solar collector panel temperature, the improvement which comprises the combination of:

thermally conductive support means mounted adjacent said closed fluid path and connected directly between both said collector panel and said collector housing, and a thermally responsive mechanical valve means for controlling the fluid flow rate supported between said thermally conductive support means in said closed fluid path to sense the temperature gradient between said solar collector panel and said collector housing, said valve means being thus responsive to a combined temperature which is a function of both the solar collector panel temperature and the collector housing temperature to achieve a lower fluid flow rate when the ambient temperature drops and to achieve a higher fluid flow rate when the ambient temperature rises.

2. The improved control apparatus of claim 1 wherein said thermally conductive support means is thermally connected to the hot end of said solar collector panel.

3. The improved control apparatus of claim 1 including an unexposed wall within said collector housing wherein said thermally conductive support means is thermally connected to the unexposed wall of said collector housing.

4. The improved control apparatus of claim 1 wherein said thermally conductive support means comprise metallic support brackets.

5. The improved control apparatus of claim 4 wherein said thermally responsive valve means is supported by said metallic support brackets between the unexposed side of said solar panel and an unexposed wall of said housing.

6. The improved control apparatus of claim 4 further said metallic support brackets comprising upper brackets and lower brackets, and comprising insulating pads interposed between said upper and lower brackets and said solar collector panel and said collector housing, respectively.

* * * * *